US012720000B2

(12) United States Patent
Li et al.

(10) Patent No.: US 12,720,000 B2
(45) Date of Patent: Aug. 25, 2026

(54) MULTI-CAMERA FRAME SYNCHRONIZATION CONTROL METHOD AND SELF-PROPELLED DEVICE

(71) Applicant: Beijing Roborock Innovation Technology Co., Ltd., Beijing (CN)

(72) Inventors: Jie Li, Beijing (CN); Zhanzhi Zhang, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 23 days.

(21) Appl. No.: 18/726,811

(22) PCT Filed: Jul. 13, 2022

(86) PCT No.: PCT/CN2022/105539
§ 371 (c)(1),
(2) Date: Jul. 4, 2024

(87) PCT Pub. No.: WO2023/130706
PCT Pub. Date: Jul. 13, 2023

(65) Prior Publication Data

US 2025/0071231 A1 Feb. 27, 2025

(30) Foreign Application Priority Data

Jan. 4, 2022 (CN) ......................... 202210005387.4

(51) Int. Cl.
*H04N 5/067* (2006.01)
*H04N 23/66* (2023.01)
*H04N 23/90* (2023.01)

(52) U.S. Cl.
CPC ............. *H04N 5/067* (2013.01); *H04N 23/66* (2023.01); *H04N 23/90* (2023.01)

(58) Field of Classification Search
CPC ........ H04N 5/067; H04N 23/66; H04N 23/90; H04N 5/0733; H04N 23/60; H04N 23/662
See application file for complete search history.

(56) References Cited

U.S. PATENT DOCUMENTS

2007/0013807 A1 1/2007 Kanai et al.
2016/0021292 A1* 1/2016 Zhang ...................... H04N 5/06 348/211.2

(Continued)

FOREIGN PATENT DOCUMENTS

CN 102186065 A 9/2011
CN 105391924 A 3/2016

(Continued)

OTHER PUBLICATIONS

First Office Action for JP Patent Application No. 2024-540627 of Apr. 22, 2025.

(Continued)

*Primary Examiner* — Mekonnen D Dagnew
(74) *Attorney, Agent, or Firm* — Perilla Knox & Hildebrandt; Kenneth A. Knox

(57) ABSTRACT

A method for performing frame synchronization control on a first camera and a second camera of a self-propelled device includes: sending, in response to capturing a first image frame, a synchronization instruction to a controller of the self-propelled device; in response to receiving the synchronization instruction, determining a sending timepoint of a frame synchronization signal based on a time offset relative to a timepoint of capturing the first image frame; and sending the frame synchronization signal to the second camera at the sending timepoint, thereby controlling the second camera to capture a second image frame.

20 Claims, 3 Drawing Sheets

(56) References Cited

U.S. PATENT DOCUMENTS

| | | | | |
|---|---|---|---|---|
| 2020/0068123 | A1* | 2/2020 | Chen | H04N 7/01 |
| 2022/0198714 | A1* | 6/2022 | del Pero | G06T 7/85 |

FOREIGN PATENT DOCUMENTS

| | | | |
|---|---|---|---|
| CN | 106161943 | A | 11/2016 |
| CN | 106973234 | A | 7/2017 |
| CN | 109788264 | A | 5/2019 |
| CN | 109901353 | A | 6/2019 |
| CN | 111770269 | A | 10/2020 |
| CN | 111831054 | A | 10/2020 |
| CN | 213092100 | U | 4/2021 |
| CN | 114598786 | A | 6/2022 |
| JP | H04322594 | A | 11/1992 |
| JP | 2002223434 | A | 8/2002 |
| JP | 2004048302 | A | 2/2004 |
| JP | 2004254073 | A | 9/2004 |
| JP | 2006033346 | A | 2/2006 |
| JP | 2007028043 | A | 2/2007 |
| JP | 2012138671 | A | 7/2012 |
| JP | 2019125095 | A | 7/2019 |
| KR | 20190078088 | A | 7/2019 |
| KR | 20210050192 | A | 5/2021 |

OTHER PUBLICATIONS

International Search Report for International Application No. PCT/CN2022/105539.

First Office Action for CN Patent Application No. 202210005387.4.

Notice of Allowance for CN Patent Application No. 202210005387.4.

Wang et al., "Design and Realization of Image Tracking System Based on High Resolution Camera," Optics & Optoelectronic Technology, vol. 9, No. 3 (Jun. 2011).

First Office Action for KR Patent Application No. 10-2024-7025522 of Oct. 7, 2025-.

Extended European Search Report for Patent Application No. 22918162.3 of Dec. 8, 2025.

* cited by examiner

MULTI-CAMERA FRAME SYNCHRONIZATION CONTROL METHOD AND SELF-PROPELLED DEVICE

CROSS-REFERENCE TO RELATED APPLICATIONS

This application is a national phase application under 35 U.S.C. § 371 of International Patent Application No. PCT/CN2022/105539 filed on Jul. 13, 2022, entitled "Multi-Frame Synchronization Control Method and Self-Propelled Device, which claims the benefit of and priority to Chinese Patent Application No. 202210005387.4, filed on Jan. 4, 2022, the contents of both of which being incorporated by reference in their entireties herein.

TECHNICAL FIELD

The present application relates to the technical field of intelligent devices and, in particular, to a multi-camera frame synchronization control method, a self-propelled device, a non-transitory computer-readable storage medium, and an electronic device.

BACKGROUND

With the development of artificial intelligence, intelligent devices in various scenarios are becoming more and more common. These intelligent devices, such as smart home devices and self-driving delivery vehicles, can move on their own in order to complete cleaning, transportation, and other tasks. The self-propelled intelligent devices are all equipped with cameras. In order to acquire surrounding images from a plurality of directions and angles, there are often two cameras (binocular cameras) or more cameras (multiocular cameras).

BRIEF SUMMARY

In view of above, the present application provides a multi-camera frame synchronization control method, a self-propelled device, a storage medium, and an electronic device for performing synchronization control on image frames captured by a plurality of cameras, among other improvements over the art.

According to one aspect of the present application, a multi-camera frame synchronization control method is provided for performing frame synchronization control on images of a first camera and a second camera of a self-propelled device. The method includes: sending a synchronization instruction when the first camera captures a first image frame; in response to receiving the synchronization instruction, determining a sending timepoint of a frame synchronization signal based on a time offset relative to a timepoint when the first camera captures the first image frame; and sending the frame synchronization signal to the second camera at the sending timepoint, thereby controlling the second camera to capture a second image frame.

According to one aspect of the present application, a self-propelled device is provided. The self-propelled device includes a first camera, a second camera and a controller, wherein the first camera is configured to send a synchronization instruction when capturing a first image frame; and the controller is configured to, in response to receiving the synchronization instruction, determine a sending timepoint of a frame synchronization signal based on a time offset relative to a timepoint when the first camera captures the first image frame, and send the frame synchronization signal to the second camera at the sending timepoint, thereby controlling the second camera to capture a second image frame.

According to one aspect of the present application, a storage medium is provided and has a computer program stored therein, wherein the computer program is configured to, upon being executed, implement the multi-camera frame synchronization control method described above.

According to one aspect of the present application, an electronic device is provided and includes a memory and a processor, wherein the memory has a computer program stored therein, and the processor is configured to execute the computer program to implement the multi-camera frame synchronization control method described above.

According to the technical solutions described above, for the multi-camera frame synchronization control method, the self-propelled device, the storage medium and the electronic device provided by the present application, the sending timepoint of the frame synchronization signal is determined according to the time offset based on a capturing timepoint of the first camera, and the frame synchronization signal is sent at the sending timepoint to control the timepoint for the second camera to perform capturing, which can ensure peak-shifting capturing between respective cameras in the same signal cycle, thereby achieving the purpose of time division multiplexing on capturing images by different cameras.

The above illustrations are only an overview of the technical solutions of the present application. In order to understand the technical means of the present application more clearly, it can be implemented according to the contents of the description. Moreover, in order to enable the above and other purposes, features and advantages of the present application more clear and understandable, the following gives detailed embodiments of the present application.

BRIEF DESCRIPTION OF THE DRAWINGS

The accompanying drawings described herein are intended to provide a further understanding of the present application and constitute a part of the present application. The illustrative embodiments of the present application and their descriptions are used to explain the present application, rather than constituting undue limitations on the present application. In the accompanying drawings.

DETAILED DESCRIPTION

In order to make those skilled in the art better understand the solutions of the present application, the technical solutions in the embodiments of the present application will be described clearly and completely in combination with the accompanying drawings in the embodiments of the present application. Understandably, the described embodiments are only part but not all of the embodiments of the present application. Based on the embodiments in the present application, all other embodiments obtained by those skilled in the art without creative labor should fall within the protection scope of the present application. It should be noted that the embodiments and the features in the embodiments in the present application may be combined with each other without conflict.

Figure 1:
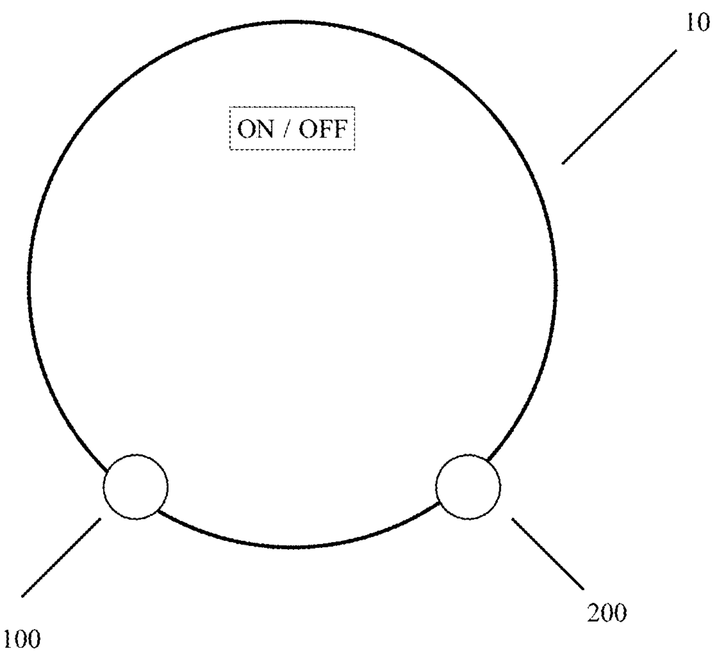
FIG. 1 shows a schematic diagram of an implementation scenario of a multi-camera frame synchronization control method according to an embodiment of the present application.

Referring to FIG. 1, a schematic diagram of an implementation scenario of a multi-camera frame synchronization control method is shown according to an embodiment of the present application. This particular scenario shows a self-propelled device 10, and the self-propelled device 10 is equipped with at least two cameras. In FIG. 1, a first camera 100 and a second camera 200 are exemplarily shown, and the first camera 100 and the second camera 200 cooperate to perform image capturing, thereby ensuring that images from a plurality of directions and a plurality of angles are acquired, so as to obtain a surrounding environment of the self-propelled device 10 more completely and clearly and to provide a basis for obstacle avoidance of the self-propelled device 10 during movement. The self-propelled device 10 may be an intelligent device, such as a cleaning robot, a self-driving delivery vehicle, or a companion robot, which is not limited by the embodiment of the present application. It can be understood that the self-propelled device mentioned in the embodiment of the present application may be all self-propelled intelligent devices at present and in the future.

Figure 2:
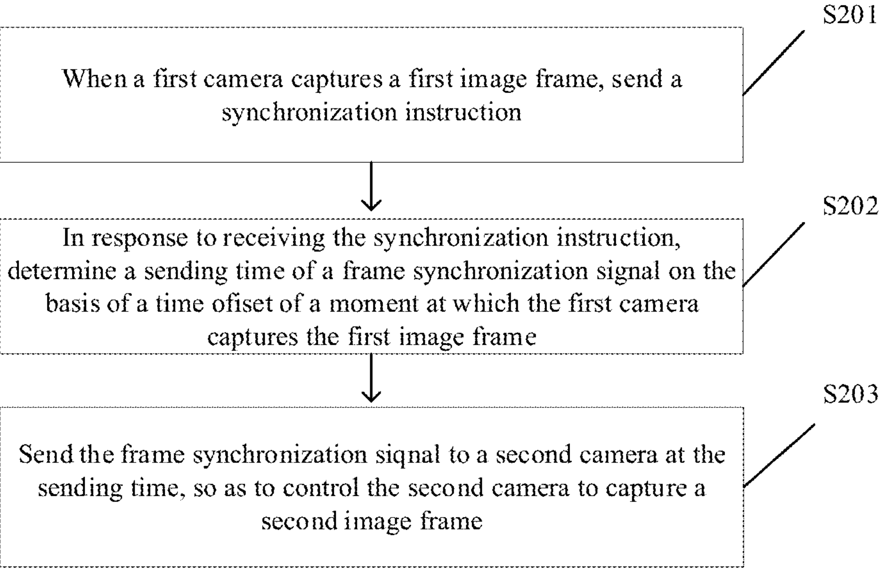
FIG. 2 shows a flowchart of Example I of a multi-camera frame synchronization control method according to an embodiment of the present application.

Referring to FIG. 2, which is a flowchart of Example I of a multi-camera frame synchronization control method according to an embodiment of the present application, the method is used for performing frame synchronization control on images from a first camera and a second camera of a self-propelled device, and includes the following processes S201 to S203.

In S201: a synchronization instruction is sent when the first camera captures a first image frame.

It can be understood that, for the self-propelled device using binocular cameras (or multiocular cameras), it is necessary to acquire the images captured by two (or more) cameras in the same capturing signal cycle, thereby providing a basis for image synthesis, calibration, and analysis. Therefore, it is necessary to perform clock synchronization on two or more cameras. The clock synchronization here means that at least two images captured by respective cameras in a peak-shifting manner (the first camera captures the first image frame and the second camera captures a second image frame) are controlled within the same capturing signal cycle of a capturing clock.

It can be understood that, based on the multi-camera frame synchronization control method according to the embodiment of the present application, synchronization control can be performed on the image frames of at least two cameras. For the sake of simplicity, the following takes two cameras (the first camera and the second camera) as an example for illustration. For the scenarios with more than two cameras, the solution provided by the embodiment of the present application may also be used for processing.

In one implementation, in order to perform clock synchronization on the two cameras, the embodiment of the present application adopts a mode that when one camera (for example, a master camera) performs capturing, the other camera (for example, a slave camera) does not perform capturing or the captured image is discarded. Similarly, when the slave camera performs capturing, the master camera does not perform capturing or the captured image is discarded. At the same time, when the first camera performs capturing, the capturing timepoint is recorded, and the synchronization instruction is sent at this timepoint, so as to control the subsequent clock synchronization on the second camera.

In S202: in response to receiving the synchronization instruction, a sending timepoint of a frame synchronization signal is determined based on a time offset relative to a timepoint when the first camera captures the first image frame.

Assuming that the first camera starts capturing the first image frame at a timepoint to, the synchronization instruction is sent at the timepoint t0, and the purpose of the synchronization instruction is to record the timepoint when the first camera starts capturing. Then, the sending timepoint of the frame synchronization signal is determined according to the time offset relative to the timepoint when the first camera captures the first image frame.

In S203: the frame synchronization signal is sent to the second camera at the above sending timepoint, thereby controlling the second camera to capture the second image frame.

Assuming that the first camera captures the first image frame at the timepoint t0, based on a time offset Δt of capturing image frames by the two cameras, the second camera is controlled to capture the second image frame at a timepoint "t0+Δt".

It can be seen that in order to realize the clock synchronization of different cameras, capturing the first image frame by the first camera and capturing the second image frame by the second camera are completed within the same capturing signal cycle, wherein a capturing timepoint of the second image frame is controlled to be different from a capturing timepoint of the first image frame based on the time offset.

Figure 3:
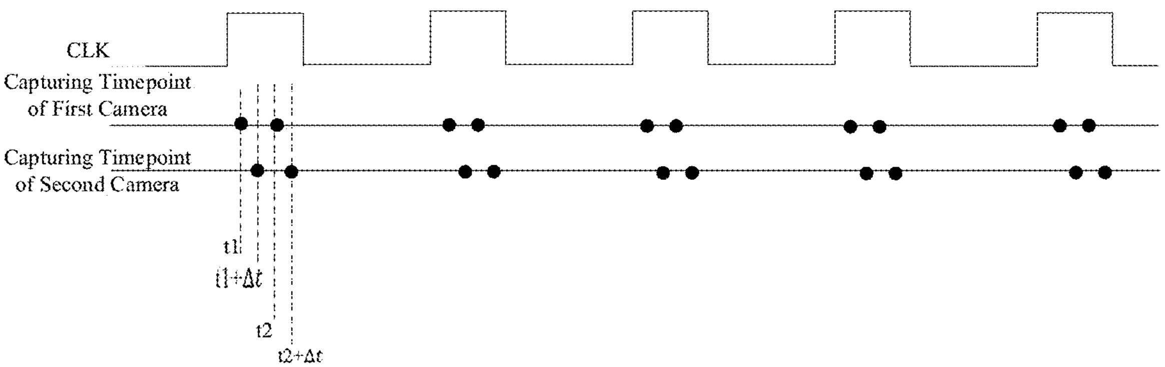
FIG. 3 shows a schematic diagram of peak-shifting capturing in the same capturing signal cycle according to an embodiment of the present application.

Referring to FIG. 3, it is a schematic diagram of peak-shifting capturing of two cameras within the same capturing signal cycle. In the example of FIG. 3, the first camera and the second camera use capturing clocks CLK of the same frequency, and are controlled to perform capturing at least once (i.e., at least one first image frame and at least one second image frame are captured) in a peak-shifting manner within each capturing signal cycle of the CLK. FIG. 3 schematically shows that each camera performs capturing twice within each capturing signal cycle. Specifically, the first camera performs capturing at timepoints t1 and t2, and the second camera performs capturing at timepoints "t1+Δt" and "t2+Δt". As can be seen from the figure, these four timepoints all fall within the same capturing signal cycle.

In another implementation, in order to perform clock synchronization on the two cameras, when one camera (for example, the master camera) performs capturing, the other camera (for example, the slave camera) does not perform capturing or the captured image is discarded. Similarly, when the slave camera performs capturing, the master camera does not perform capturing or the captured image is discarded. Moreover, when the first camera performs capturing, the capturing timepoint is recorded, and the synchronization instruction is sent at this timepoint, so as to control the subsequent clock synchronization on the second camera.

It can be seen that through the multi-camera frame synchronization control method according to the embodiment of the present application, based on the capturing timepoint of the first camera, image capturing timepoint of the second camera is controlled according to the time offset, which can ensure peak-shifting capturing of all cameras within the same signal cycle, thereby achieving the purpose of time division multiplexing on the images captured by different cameras.

Figure 4:
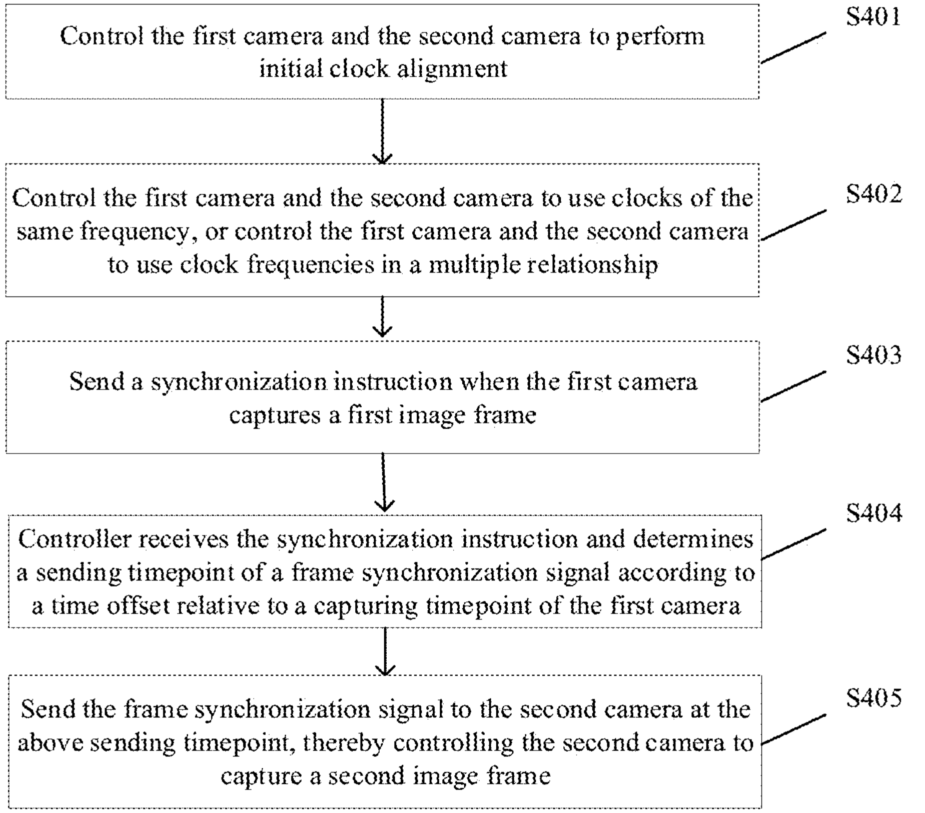
FIG. 4 shows a flowchart of Example II of a multi-camera frame synchronization control method according to an embodiment of the present application.

FIG. 4 shows a flowchart of Example II of a multi-camera frame synchronization control method according to an embodiment of the present application. The method is used for performing frame synchronization control on images from a first camera and a second camera of a self-propelled device, and includes the following processes S401 to S405.

Compared with Example I shown in FIG. 2, a controller is introduced in this example to perform clock synchronization control on the first camera and the second camera. Specifically, a solution of synchronizing the image frames of the two cameras is described under the premise that initial clocks of the two cameras are aligned and the two cameras use the same or multiple frequency clocks.

In S401: the first camera and the second camera are controlled to perform initial clock alignment.

For example, by controlling the first camera and the second camera to be turned on at the same time, or controlling the first camera and the second camera to be turned on within a preset minimum time interval, the initial clock alignment of the first camera and the second camera is ensured.

In S402: the first camera and the second camera are controlled to use clocks of the same frequency, or the first camera and the second camera are controlled to use clock frequencies in a multiple relationship.

In one implementation, the first camera and the second camera are controlled to use the clocks of the same frequency. For example, the first camera and the second camera are controlled to use the same clock signal, thereby ensuring that the first camera and the second camera have the clocks of the same frequency. When each clock pulse arrives, image capturing is performed. For example, assuming that frame rates of the first camera and the second camera are both 30 frames per second (fps), it means 30 frames of images are controlled to be captured per second from the start of the camera.

In another implementation, the first camera and the second camera are controlled to use the clock frequencies in a multiple relationship. For example, the frame rate of the first camera is 15 fps and the frame rate of the second camera is 30 fps, that is, the frame rate of the second camera is twice that of the first camera.

In S403: when the first camera captures a first image frame, a synchronization instruction is sent.

The embodiment of the present application adopts a mode that when one camera (for example, a master camera) performs capturing, the other camera (for example, a slave camera) does not perform capturing or the captured image is discarded. Similarly, when the slave camera performs capturing, the master camera does not perform capturing or the captured image is discarded. Moreover, when the first camera performs capturing, the capturing starting timepoint is recorded, and the synchronization instruction is sent at this timepoint, so as to control the subsequent clock synchronization on the second camera.

In S404: the controller receives the synchronization instruction and determines a sending timepoint of a frame synchronization signal according to a time offset relative to a capturing timepoint of the first camera.

Assuming that the first camera starts capturing the first image frame at a timepoint t0, the synchronization instruction is sent at the timepoint t0, and the purpose of the synchronization instruction is to record the timepoint when the first camera actually starts capturing. Then, the sending timepoint of the frame synchronization signal is determined according to the time offset $\Delta t$ of the two cameras. Specifically, if the first camera and the second camera use the clocks of the same frequency, it is ensured that both the timepoints t0 and "$t0+\Delta t$" are within the same clock signal cycle. If the first camera and the second camera use the frequency clocks in a multiple relationship, assuming that a clock of the first camera is CLK1, a clock of the second camera is CLK2 and the two have a multiple relationship; then, t0 is first converted to a timepoint under CLK2, and then the sending timepoint of the frame synchronization signal is determined based on the clock signal cycle of CLK2.

In S405: the frame synchronization signal is sent to the second camera at the above sending timepoint, thereby controlling the second camera to capture a second image frame.

Figure 5:
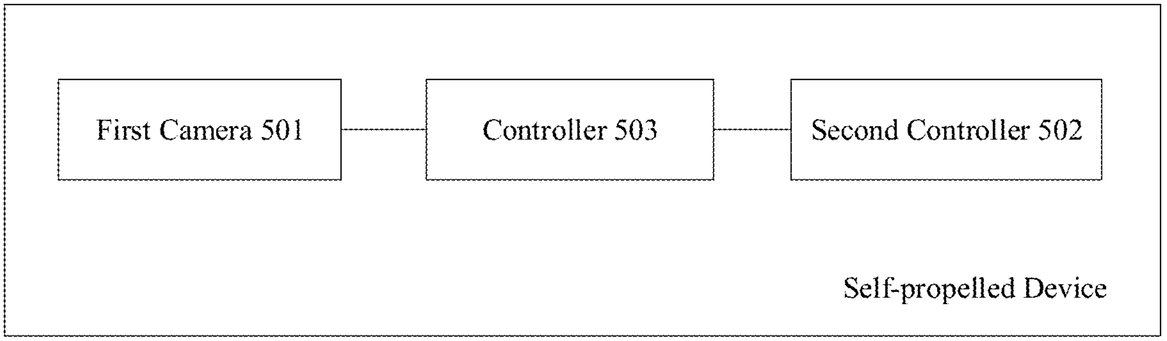
FIG. 5 shows a schematic structural diagram of a self-propelled device according to an embodiment of the present application.

Corresponding to the above multi-camera frame synchronization control method, an embodiment of the present application further provides a self-propelled device. Referring to FIG. 5, a structural schematic diagram of the self-propelled device according to an embodiment of the present application is shown.

The self-propelled device at least includes a first camera 501, a second camera 502, and a controller 503. The first camera 501 is configured to send a synchronization instruction when capturing a first image frame. The controller 503 is configured to, in response to receiving the synchronization instruction sent by the first camera 501, determine a sending timepoint of a frame synchronization signal based on a time offset relative to a timepoint when the first camera captures the first image frame, and send the frame synchronization signal to the second camera 502 at the above sending timepoint, thereby controlling the second camera to capture a second image frame.

In one implementation, the controller 503 is further configured to determine the sending timepoint of the frame synchronization signal according to a preset operating clock difference value between the first camera and the second camera.

In one implementation, the controller 503 is further configured to control the first camera 501 and the second camera 502 to perform initial clock alignment.

In one implementation, the controller 503 is further configured to control the first camera 501 and the second camera 502 to be turned on at the same time, or to control the first camera 501 and the second camera 502 to be turned on within a preset minimum time interval, so as to ensure the initial clock alignment to be met between the first camera 501 and the second camera 502.

In one implementation, the controller 503 is further configured to control the first camera 501 and the second camera 502 to use clocks of the same frequency, or to control the first camera 501 and the second camera 502 to use clock frequencies in a multiple relationship.

In one implementation, the controller 503 is further configured to control the first camera to capture the first image frame and the second camera to capture the second image frame within the same capturing signal cycle, wherein a capturing timepoint of the second image frame is controlled to be different from a capturing timepoint of the first image frame based on the time offset.

In one implementation, the controller 503 is further configured to control the second camera not to perform capturing or discard the image captured by the second camera when the first camera captures the first image frame, and control the first camera not to perform capturing, or discard the image captured by the first camera when the second camera captures a second image.

An embodiment of the present application further provides a storage medium, having a computer program stored therein, wherein the computer program is configured to, upon being executed, implement the processes in any of the above method embodiments.

Optionally, in the present embodiment, the above storage medium may be configured to store the computer program for implementing the following:

(1) sending a synchronization instruction when a first camera captures a first image frame;

(2) in response to receiving the synchronization instruction, determining a sending timepoint of a frame synchronization signal based on a time offset relative to a timepoint w % ben the first camera captures the first image frame; and (3) sending the frame synchronization signal to a second camera at the sending timepoint, thereby controlling the second camera to capture a second image frame.

Optionally, in the present embodiment, the above storage medium may include, but is not limited to, a U disk, a read-only memory (ROM), a random access memory (RAM), a mobile hard disk, a magnetic disk, an optical disk, or other mediums that can store the computer program.

An embodiment of the present application further provides an electronic device, including a memory and a processor. The memory has a computer program stored therein. The processor is configured to execute the computer program to implement the processes in any of the above method embodiments. In some embodiment, the processor is implemented as the controller described above.

Optionally, the above electronic device may further include a transmission apparatus and an input/output apparatus, wherein the transmission apparatus is connected with the above processor, and the input/output apparatus is connected with the above processor.

Optionally, in the present embodiment, the above processor may be configured to execute the following processes based on the computer program:

(1) sending a synchronization instruction when a first camera captures a first image frame;

(2) in response to receiving the synchronization instruction, determining a sending timepoint of a frame synchronization signal based on a time offset relative to a timepoint when the first camera captures the first image frame; and (3) sending the frame synchronization signal to a second camera at the sending timepoint, thereby controlling the second camera to capture a second image frame.

Optionally, the specific example in the present embodiment may refer to the examples described in the above embodiments and optional implementations, which will not repeated in the present embodiment here.

The above serial numbers of the embodiments of the present application are only for description, and do not represent the advantages and disadvantages of the embodiments.

In the above embodiments of the present application, the description of each embodiment has its own emphasis. For the parts not detailed in one embodiment, the relevant descriptions of other embodiments can be referred to.

In the several embodiments according to the present application, it should be understood that the disclosed technical contents may be implemented in other manners. The device embodiments described above are merely illustrative. For example, the division of the units is only logical function division. In actual implementation, there may exist other division manners. For example, multiple units or assemblies may be combined or integrated into another system, or some features may be ignored or not executed. In addition, the mutual coupling or direct coupling or communication connection shown or discussed may be indirect coupling or communication connection by certain interfaces, units or modules, or in electrical or other forms.

The units described as separate components may be or may not be physically separate, and the components displayed as units may be or may not be physical units, that is, may be located in one place, or may be distributed to multiple network units. Part or all of the units may be selected according to actual needs to achieve the objectives of the solutions of the embodiments.

In addition, respective functional units in respective embodiments of the present application may be integrated into one processing unit, or each unit may exist physically and separately, or two or more units may be integrated into one unit. The above integrated unit may be implemented in the form of hardware or in the form of a software functional unit.

The integrated unit, if implemented in the form of the software functional unit and sold or used as an independent product, may be stored in a computer readable storage medium. Based on such understanding, the part of the technical solution of the present application which contributes in essence or to the prior art, or all or part of the technical solution may be embodied in the form of a software product. The computer software product is stored in a storage medium including a number of instructions. The instructions cause a computer device (which may be a personal computer, server, or network device, etc.) to execute all or part of the processes of the various embodiment methods of the present application. The foregoing storage medium includes various mediums that can storage program codes, such as U disk, a ROM, RAM, mobile hard disk, magnetic disk, or optical disk.

The foregoing description is merely example embodiments of the present disclosure. It should be noted that those skilled in the art can make some improvements and modifications without departing from the principle of the present application, and these improvements and modifications shall fall within the protection scope of the present application.

What is claimed is:

1. A method for performing frame synchronization control on a first camera and a second camera of a self-propelled device, comprising:

sending, by the first camera in response to capturing a first image frame, a synchronization instruction to a controller of the self-propelled device;

in response to receiving the synchronization instruction, determining, by the controller, a sending timepoint of a frame synchronization signal based on a time offset relative to a timepoint of capturing the first image frame; and sending, by the controller, the frame synchronization signal to the second camera at the sending timepoint, thereby controlling the second camera to capture a second image frame, wherein the first camera and the second camera are controlled to perform capturing at least once in a peak-shifting manner within each capturing signal cycle, thereby obtaining at least one first image frame and at least one second image frame within each capturing signal cycle.

2. The method according to claim 1, further comprising: determining, by the controller, a preset operating clock difference between the first camera and the second camera as the time offset.

3. The method according to claim 1, further comprising: controlling, by the controller, the first camera and the second camera to perform initial clock alignment.

4. The method according to claim 3, wherein controlling, by the controller, the first camera and the second camera to perform the initial clock alignment comprises:

controlling the first camera and the second camera to be turned on simultaneously, or controlling the first camera and the second camera to be turned on within a preset minimum time interval, thereby ensuring the initial clock alignment to be met between the first camera and the second camera.

5. The method according to claim 1, further comprising: controlling, by the controller, the first camera and the second camera to use clocks of a same frequency, or controlling, by the controller, the first camera and the second camera to use clock frequencies in a multiple relationship.

6. The method according to claim 1, further comprising:

controlling, by the controller, the first camera to capture the first image frame and the second camera to capture the second image frame within a same capturing signal cycle, and controlling, by the controller, a capturing timepoint of the second image frame to be different from a capturing timepoint of the first image frame based on the time offset.

7. The method according to claim 1, further comprising:

controlling the second camera not to perform capturing or discarding images captured by the second camera upon capturing of the first image frame; and controlling the first camera not to perform capturing or discarding images captured by the first camera upon capturing of the second image frame.

8. A self-propelled device, comprising:

a first camera, a second camera, and a controller, wherein:

the first camera is configured to send a synchronization instruction to the controller in response to capturing a first image frame;

the controller is configured to, in response to receiving the synchronization instruction, determine a sending timepoint of a frame synchronization signal based on a time offset relative to a timepoint of capturing the first image frame; and send the frame synchronization signal to the second camera at the sending timepoint, thereby controlling the second camera to capture a second image frame; and the first camera and the second camera are controlled to perform capturing at least once in a peak-shifting manner within each capturing signal cycle, thereby obtaining at least one first image frame and at least one second image frame within each capturing signal cycle.

9. The device according to claim 8, wherein the controller is configured to determine a preset operating clock difference between the first camera and the second camera as the time offset.

10. The device according to claim 8, wherein the controller is further configured to control the first camera and the second camera to perform initial clock alignment.

11. The device according to claim 10, wherein the controller is further configured to control the first camera and the second camera to be turned on simultaneously, or control the first camera and the second camera to be turned on within a preset minimum time interval, thereby ensuring the initial clock alignment to be met between the first camera and the second camera.

12. The device according to claim 8, wherein the controller is further configured to control the first camera and the second camera to use clocks of a same frequency, or to control the first camera and the second camera to use clock frequencies in a multiple relationship.

13. The device according to claim 8, wherein the controller is further configured to control the first camera to capture the first image frame and the second camera to capture the second image frame within a same capturing signal cycle, and control a capturing timepoint of the second image frame to be different from a capturing timepoint of the first image frame based on the time offset.

14. The device according to claim 8, wherein the controller is further configured to control the second camera not to perform capturing or discard images captured by the second camera upon capturing of the first image frame, and control the first camera not to perform capturing or discard images captured by the first camera upon capturing of the second image frame.

15. A non-transitory computer-readable storage medium, having a computer program stored therein that, when executed by at least one hardware processor, directs the at least one hardware processor to perform a method for performing frame synchronization control on a first camera and a second camera of a self-propelled device, the method comprising:

sending, in response to capturing a first image frame, a synchronization instruction to a controller of the self-propelled device;

in response to receiving the synchronization instruction, determining a sending timepoint of a frame synchronization signal based on a time offset relative to a timepoint of capturing the first image frame; and sending the frame synchronization signal to the second camera at the sending timepoint, thereby controlling the second camera to capture a second image frame, wherein the first camera and the second camera are controlled to perform capturing at least once in a peak-shifting manner within each capturing signal cycle, thereby obtaining at least one first image frame and at least one second image frame within each capturing signal cycle.

16. The storage medium according to claim 15, wherein the method further comprises determining a preset operating clock difference between the first camera and the second camera as the time offset.

17. The storage medium according to claim 15, wherein the method further comprises controlling the first camera and the second camera to perform initial clock alignment.

18. The storage medium according to claim 17, wherein controlling the first camera and the second camera to perform the initial clock alignment comprises:

controlling the first camera and the second camera to be turned on simultaneously, or controlling the first camera and the second camera to be turned on within a preset minimum time interval, thereby ensuring the initial clock alignment to be met between the first camera and the second camera.

19. The storage medium according to claim 15, wherein the method further comprises controlling the first camera and the second camera to use clocks of a same frequency, or controlling the first camera and the second camera to use clock frequencies in a multiple relationship.

20. The storage medium according to claim 15, wherein the method further comprises controlling the first image frame and the second image frame to be captured within a same capturing signal cycle, and controlling a capturing timepoint of the second image frame to be different from a capturing timepoint of the first image frame based on the time offset.

* * * * *